(12) United States Patent  
Casati et al.

(10) Patent No.: US 8,494,163 B2
(45) Date of Patent: Jul. 23, 2013

(54) ENCRYPTION IN A WIRELESS TELECOMMUNICATIONS

(75) Inventors: Alessio Casati, Swindon (GB); Sudeep Kumar Palat, Swindon (GB); Said Tatesh, Swindon (GB)

(73) Assignee: Alcatel Lucent, Paris (FR)

( * ) Notice: Subject to any disclaimer, the term of this patent is extended or adjusted under 35 U.S.C. 154(b) by 483 days.

(21) Appl. No.: 12/443,109

(22) PCT Filed: Aug. 6, 2007

(86) PCT No.: PCT/EP2007/006995
§ 371 (c)(1),
(2), (4) Date: Dec. 4, 2009

(87) PCT Pub. No.: WO2008/040412
PCT Pub. Date: Apr. 10, 2008

(65) Prior Publication Data
US 2010/0067697 A1 Mar. 18, 2010

(30) Foreign Application Priority Data
Oct. 3, 2006 (GB) .................................. 0619499.7

(51) Int. Cl.
*H04K 1/00* (2006.01)
(52) U.S. Cl.
USPC ......................................................... 380/270
(58) Field of Classification Search
None
See application file for complete search history.

(56) References Cited

U.S. PATENT DOCUMENTS

| 5,920,630 | A | * | 7/1999 | Wertheimer et al. | 380/286 |
| 7,515,717 | B2 | * | 4/2009 | Doyle et al. | 380/277 |
| 2002/0066011 | A1 | * | 5/2002 | Vialen et al. | 713/150 |
| 2003/0157927 | A1 | * | 8/2003 | Yi et al. | 455/411 |
| 2003/0224754 | A1 | * | 12/2003 | Herzog | 455/406 |
| 2004/0032858 | A1 | | 2/2004 | Kuo | |
| 2004/0240412 | A1 | | 12/2004 | Winget | |

FOREIGN PATENT DOCUMENTS

| JP | 6037750 A | 2/1994 |
| JP | 6046052 A | 2/1994 |
| WO | 02/045453 A1 | 6/2002 |
| WO | WO 02/45453 A1 | 6/2002 |
| WO | 03/047154 A1 | 6/2003 |
| WO | WO 03/047154 | 6/2003 |
| WO | 2004/032858 A1 | 4/2004 |

OTHER PUBLICATIONS

3GPP 25.331 v.3.16.0—http://www.3gpp.org/ftp/specs/html-info/25331.htm.*
3GPP 25.331 c.3.16.0—http://www.3gpp.org/ftp/specs/html-info/25331.htm, Mar. 2003.*
3GPP TS 36.331 V9.2.0 (Mar. 2010), $3^{rd}$ Generation Partnership Project; Technical Specification Group Radio Access Network; Evolved Universal Terrestrial Radio Access; Radio Resource Control; Protocol Specification (Release 9).

(Continued)

*Primary Examiner* — Brandon Hoffman
(74) *Attorney, Agent, or Firm* — Fay Sharpe LLP

(57) ABSTRACT

An example of the present invention is a method of transmitting encrypted user data to a mobile terminal in a wireless telecommunications network. The method comprises sending to the mobile terminal a data packet. The data packet comprises both an identifier of encryption information to used in recovering encrypted user data, and user data encrypted using said encryption information.

23 Claims, 6 Drawing Sheets

OTHER PUBLICATIONS

"Universal Mobile Telecommunications System (UMTS); Radio Resource Control (RRC); Protocol specification (3GPP TS 25.331 version 7.2.0 Release 7); ETSI TS 125 331", IEEE, Lis, Sophia Antipolis Cedex, France, vol. 3-R2, No. V7.2.0, Sep. 1, 2006, XP014035587, pp. 1-167 and 252-335 cited in EP communication. European Communication, Application No. 07 801 546.8-1525, Aug. 20, 2012.

"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN) Radio interface protocol aspects (Release 7) V7.1.0," $3^{rd}$ Generation Partnership Project (3GPP); Technical Report (TR), XX, XX, vol. TR 25.813 V7.1.0, XP003012351, (Sep. 2006).
International Search Report/Written Opinion, Dec. 13, 2007.

* cited by examiner ent invention relates to telecommunications, in particular to wireless telecommunications.

ENCRYPTION IN A WIRELESS TELECOMMUNICATIONS

FIELD OF THE INVENTION

The present invention relates to telecommunications, in particular to wireless telecommunications.

DESCRIPTION OF THE RELATED ART

In known Universal Mobile Telecommunications System (UMTS) systems, some messages are encrypted. Encryption is initiated by a security mode command being sent from the core network via the UMTS terrestrial radio access network (UTRAN) to be received by the mobile terminal. This is followed by a security mode response being sent from the mobile terminal and received by the core network.

For example, as shown in FIG. 1, upon receiving a session, or bearer, establishment request 1, the core network (CN) 2 sends a security mode command 4 to the UTRAN 6. This causes the UTRAN 6 to forward the security mode command 4 to the mobile terminal (User Equipment, UE 8). The mobile terminal 8 reacts by initialising its encryption algorithms using specific parameter values, sometimes referred to as a security context, and then acknowledges by sending a security mode response 10 to the UTRAN 6 which passes the response 10 on to the core network 2. Thereafter an encrypted Non Access Stratum (NAS) message, such as a session establishment response 12 is sent from the core network 2 to the mobile terminal 8 via the UTRAN 6.

In this known approach, the security mode messages are unencrypted since they provide the encryption information needed to encrypt the messages that follow.

Another area of background is Long Term Evolution, LTE, networks. From UMTS networks, so-called Long Term Evolution, LTE, networks are now being developed. For background on Long Term Evolution networks, the reader is referred to Third Generation Partnership Project Technical Specification 3GPP TS23.882.

SUMMARY OF THE INVENTION

The reader is referred to the appended independent claims. Some preferred features are laid out in the dependent claims.

An example of the present invention is a method of transmitting encrypted user data to a mobile terminal in a wireless telecommunications network. The method comprises sending to the mobile terminal a data packet. The data packet comprises both an identifier of encryption information to be used in recovering encrypted user data, and user data encrypted using said encryption information.

The inventors realised that in the known approach security mode command and response signalling causes delay in session establishment procedures. For example, when the mobile terminal moves to the coverage area of another base station, there can be a change in the encryption key used. This requires security mode command and response signalling so as to inform the mobile terminal of the new key before data encrypted using the new key is sent. This additional signalling can give rise to additional delay. Such a delay may be irksome to the subscriber, and can cause problems with applications that are call setup delay sensitive, such as Push-to-talk.

In some embodiments of the invention such delays may be reduced.

BRIEF DESCRIPTION OF THE DRAWINGS

Embodiments of the present invention will now be described by way of example and with reference to the drawings, in which.

DETAILED DESCRIPTION

An example LTE network will first be described, followed by explanations of how encryption is initiated in session establishment using a combined message. This is followed by an explanation of how encryption is handled upon handover of a mobile terminal from connection with one core network node to another.

An alternative combined message is then described.

An alternative network is then described, that being a UMTS network, followed by an explanation of how encryption is initiated in that network.

Long Term Evolution Network

Figure 1:
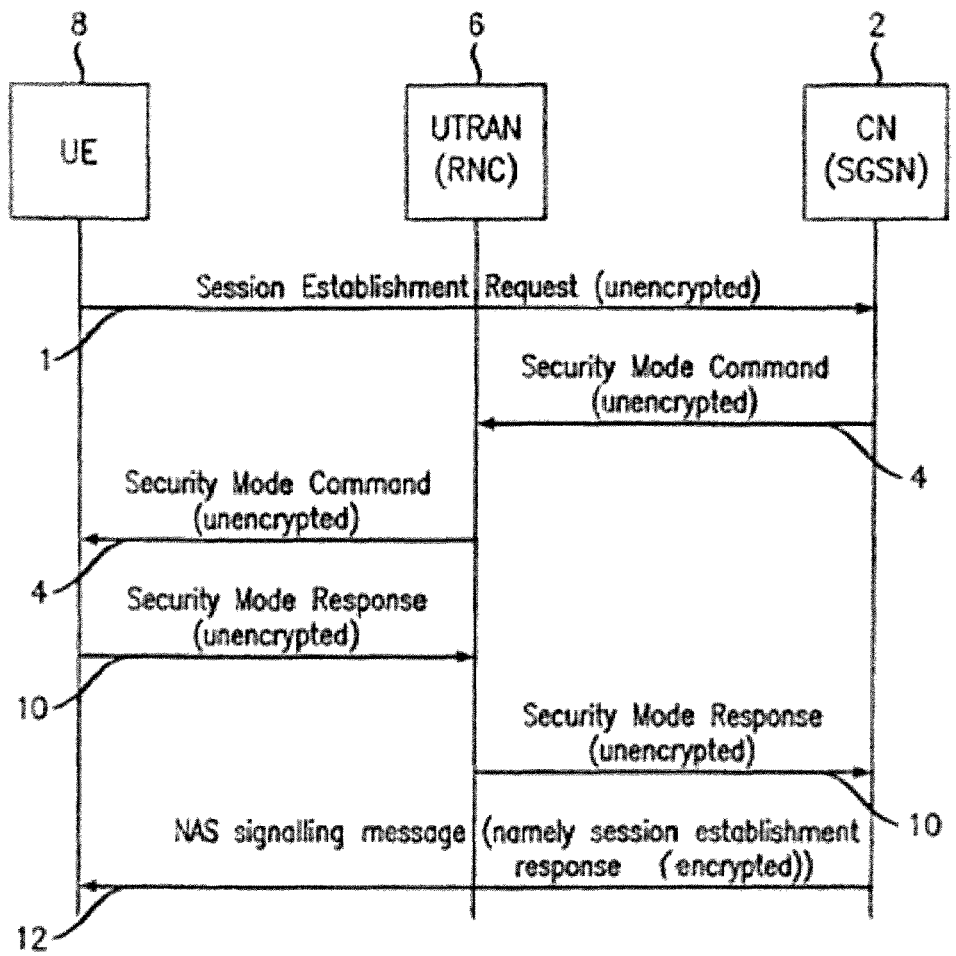
FIG. 1 is a diagram illustrating the known approach to instigating encryption as part of session establishment (PRIOR ART)
Figure 2:
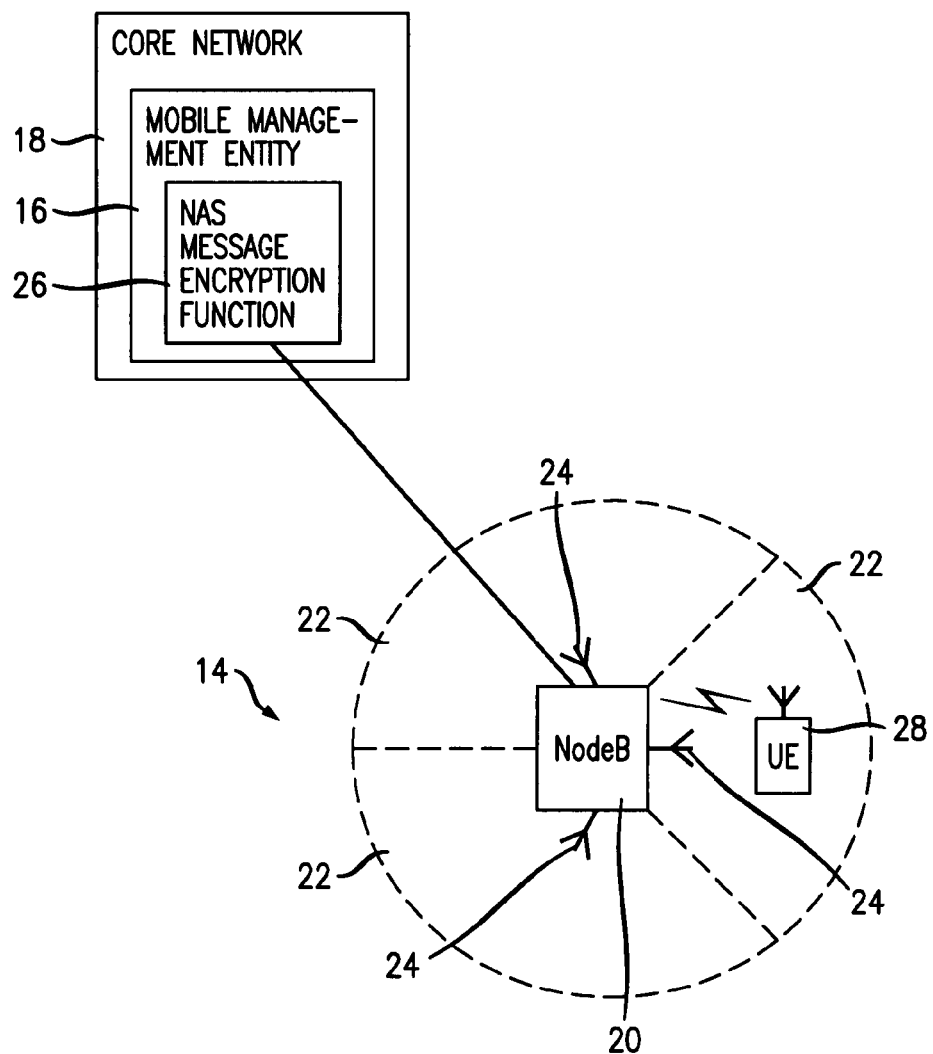
FIG. 2 is a diagram illustrating a Long Term Evolution, LTE, network according to a first embodiment of the present invention.

The LTE network 14, which is based on a Universal Mobile Telecommunications System (UMTS) network, is basically as shown in FIG. 2. The core network includes Mobile Management Entities (MME). Each MME 16 includes a NAS message encryption stage 26. In FIG. 2, only one Mobile Management Entity (MME) 16 of the core network 18 and one base station 20 of the LTE network 14 are shown for simplicity. The LTE network includes multiple base stations. In the Figure, the base station is also designated "eNode B" in accordance with LTE terminology. A cell, also referred to as a sector, is the radio-coverage area served by a corresponding antenna of a base station. Each base station 20 typically has three cells 22, each covered by one of three directional antennas 24 angled at 120 degrees to each other in azimuth.

In use, a mobile user terminal 28 (often referred to as User Equipment (UE) in LTE/UMTS terminology) communicates with a mobile management entity 16 via at least one cell 22 of at least one base station 20. In that way, the mobile user terminal communicates with the UTRAN network 2.

Instigating Encryption in Session Establishment

The inventors realised that it is possible to combine the Security mode command and Non Access Stratum (NAS) message (such as a session establishment response) into a single combined message. The first part of the message is the security mode command and this part is unencrypted. The second part of the message is a NAS message and this part is encrypted.

Figure 3:
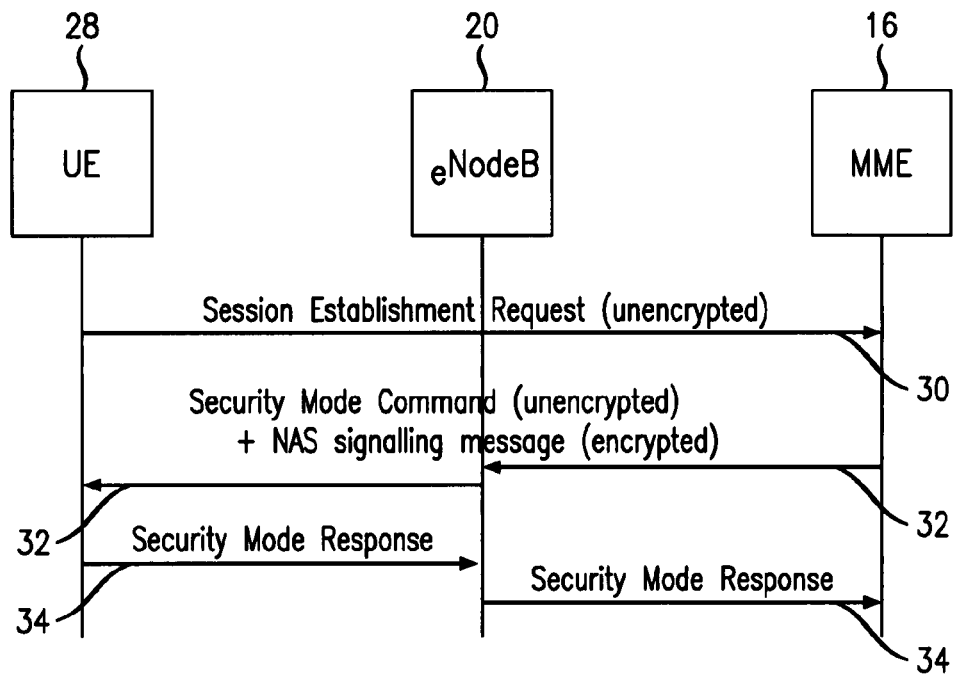
FIG. 3 is a diagram illustrating an approach to instigating encryption as part of session establishment in the network shown in FIG. 2.

As shown in FIG. 3, upon receiving a session establishment request 30, the mobile management entity 16 sends the combined message 32 consisting of the unencrypted security mode command and encrypted NAS signalling message to the base station 20. This causes the base station 20 to forward the combined message 32 to the mobile terminal (User Equipment, UE 28). The mobile terminal 28 effects initialization of its security context and then acknowledges by sending a security mode response 34 to the base station 20 from where the response 34 is forwarded on to the mobile management entity 16. Thereafter an encrypted Non Access Stratum (NAS) message, such as a session establishment response 34 is sent from the MME 16 to the mobile terminal 28 via the base station 20.

Figure 4:
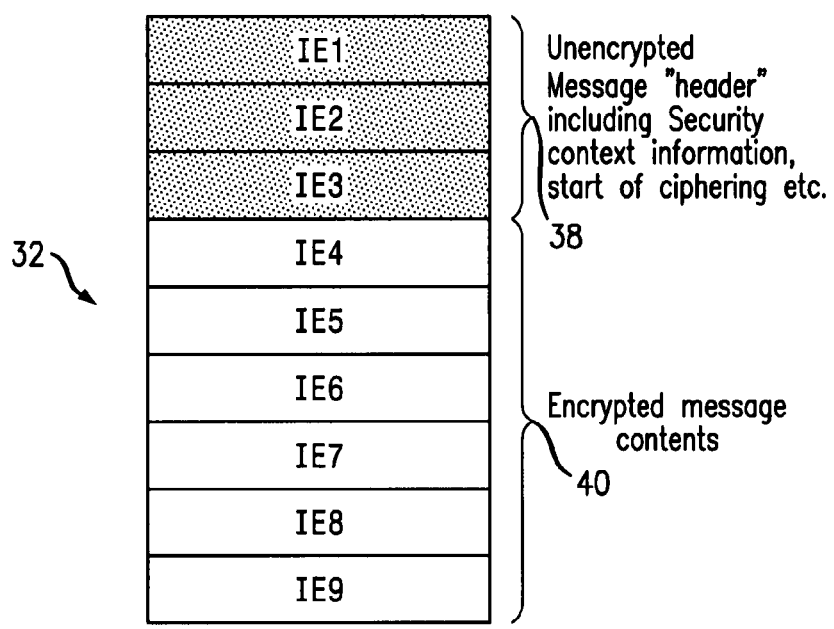
FIG. 4 is a diagram illustrating the structure of a NAS message sent in session establishment.

The combined message 32 referred to above is as shown in FIG. 4, and consists of an unencrypted security command 38 and an encrypted NAS message 40. The security command 38 consists of information elements defining security context information such as an identifier of the encryption key to be used, and for example, an identifier of start time for the encryption. The NAS message 40 consists of information elements constituting a Session Establishment response.

Production of the Combined Message

In the LTE network 14 encryption of NAS messages is performed by encryption stages 26 in the respective nodes of the core network 18. Encryption of NAS messages is independent of encryption of user data.

Figure 5:
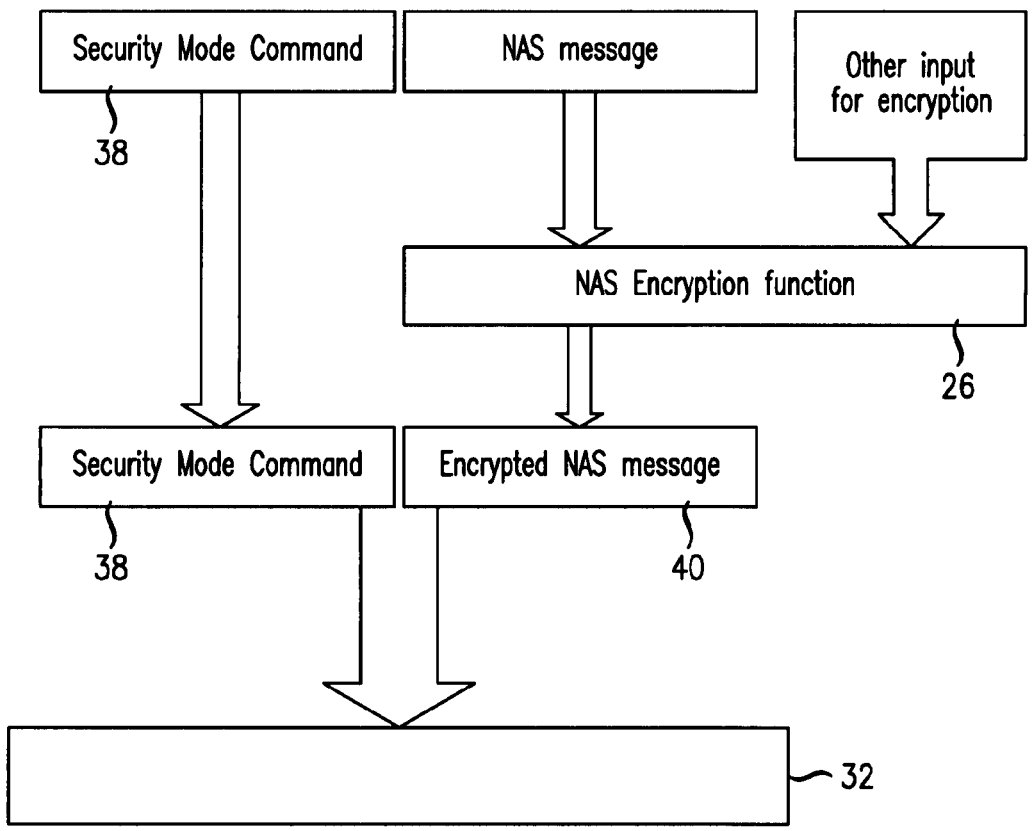
FIG. 5 is a diagram illustrating how NAS signalling messages are encrypted.

As shown in FIG. 5, the NAS message for encryption together with information to effect the encryption such as encryption keys are input to the encryption stage 26 from which the encrypted NAS message 40 is provided. The encrypted NAS message 40 is concatenated with unencrypted header information 38. This is possible because the MME 16 generally allows encryption of at least part of an NAS message before concatenation with another unencrypted message portion.

Handling Encryption Upon Handover

Handover is the process of transferring the mobile terminal 28 from connection with one base station 20 and hence core network node 18 to another base station (not shown) and hence another core network node (not shown). Handover is sometimes known as handoff.

Figure 6:
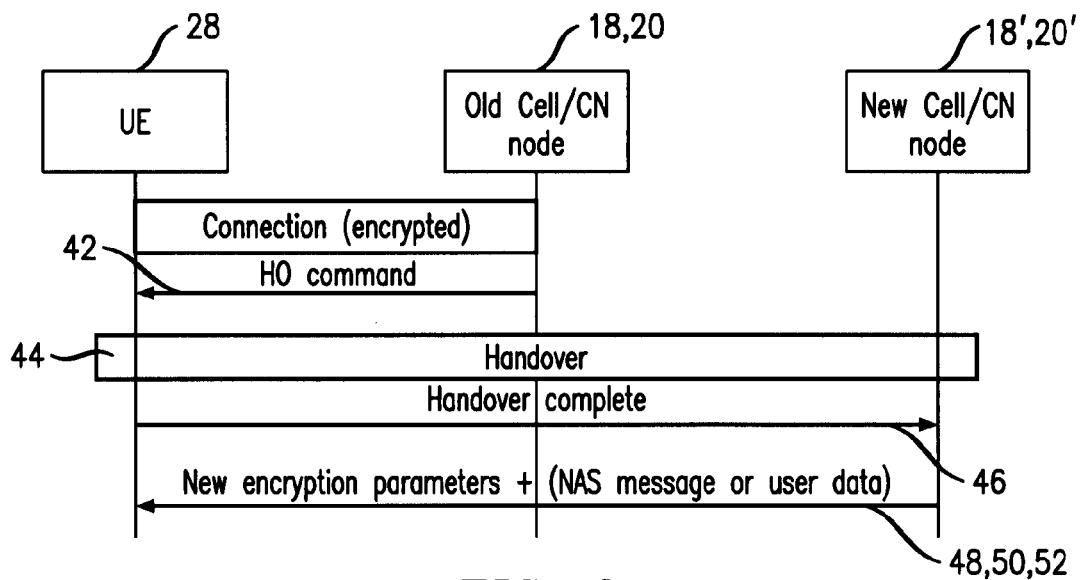
FIG. 6 is a diagram illustrating handover between core network CN nodes in the LTE network.

An example of handover procedure is shown in FIG. 6. Initially the connection is to the base station 20 and involves using a first encryption key. The core network node 18 sends a handover command 42 via the base station 20 to the mobile terminal 28, after which handover 44 of the call connection to a further base station 20' and hence core network node 20' is effected. A "handover complete" message 46 is then sent from the mobile terminal 28 to the new base station 18' and hence core network node 18'. Thereafter the core network node sends a combined message 48, consisting of an unencrypted security mode command 50 including encryption key identifiers as previously discussed, followed by an encrypted portion 52 of user data such as NAS signalling messages. So, for example, when the core network node doing encryption changes, the first combined message 50 from the new core network node 18' indicates in the security mode command the new security parameter values to be used, and includes in encrypted form, new NAS signalling messages.

In an otherwise similar embodiment, if encryption and encryption configuration is instead done in the user plane, the combined packet in the user plane consists of the unencrypted security mode command concatenated with user data.

Of course, in some embodiments, switching to a new encryption key, by sending a combined message consisting of an unencrypted security mode command including encryption key identifiers followed by an encrypted portion of user data encrypted using that encryption key, can be done at other times than handover between cells. For example, in another embodiment, the old cell and new cell can be the same cell.

In this example, initially the cell communicates with the mobile terminal using the old encryption parameters. Partway through the session the cell sends a packet containing the new encryption parameters and additional user data. The mobile terminal receives the new encryption parameters. The mobile terminal uses the new encryption parameters to decrypt the encrypted part of the packet. The mobile terminal also stores the new encryption parameters for subsequent use in decryption of subsequent packets that are encrypted using the new encryption parameters.

Radio Resource Control

Figure 7:
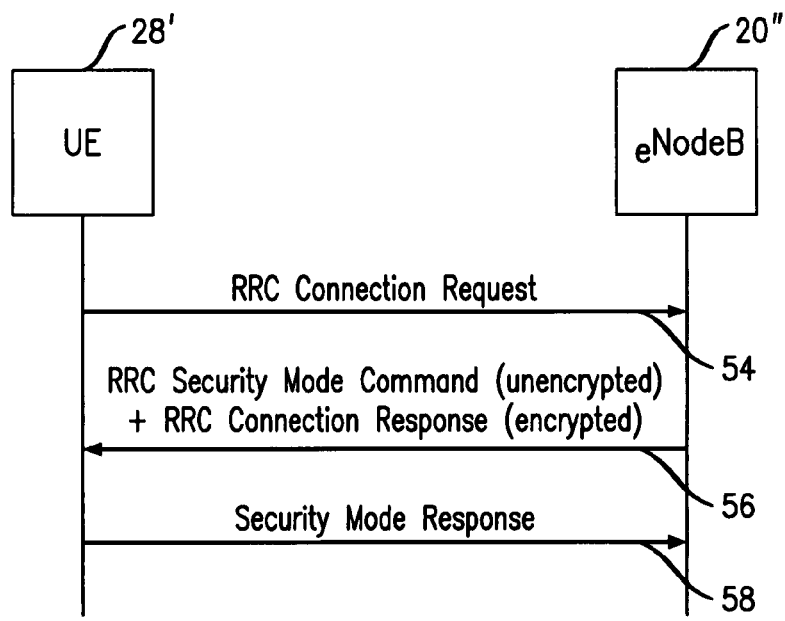
FIG. 7 is a diagram illustrating instigating encryption as part of Radio resource control, RRC, connection establishment in the LTE network.

As shown in FIG. 7, a combined message can similarly be sent consisting of an unencrypted security mode command and an encrypted user data portion, where the user data portion consists of a Radio Resource Control (RRC) message. As shown in FIG. 7, a RRC Connection Request 54 is sent to a base station 20" and the combined message 56, which more specifically comprises the unencrypted Security Mode command followed by the encrypted (with the new key) RRC Connection Response, is sent by the base station to the mobile terminal 28' in reply. A security mode response is then sent from the user terminal 28'.

Another Example System: UMTS

Figure 8:
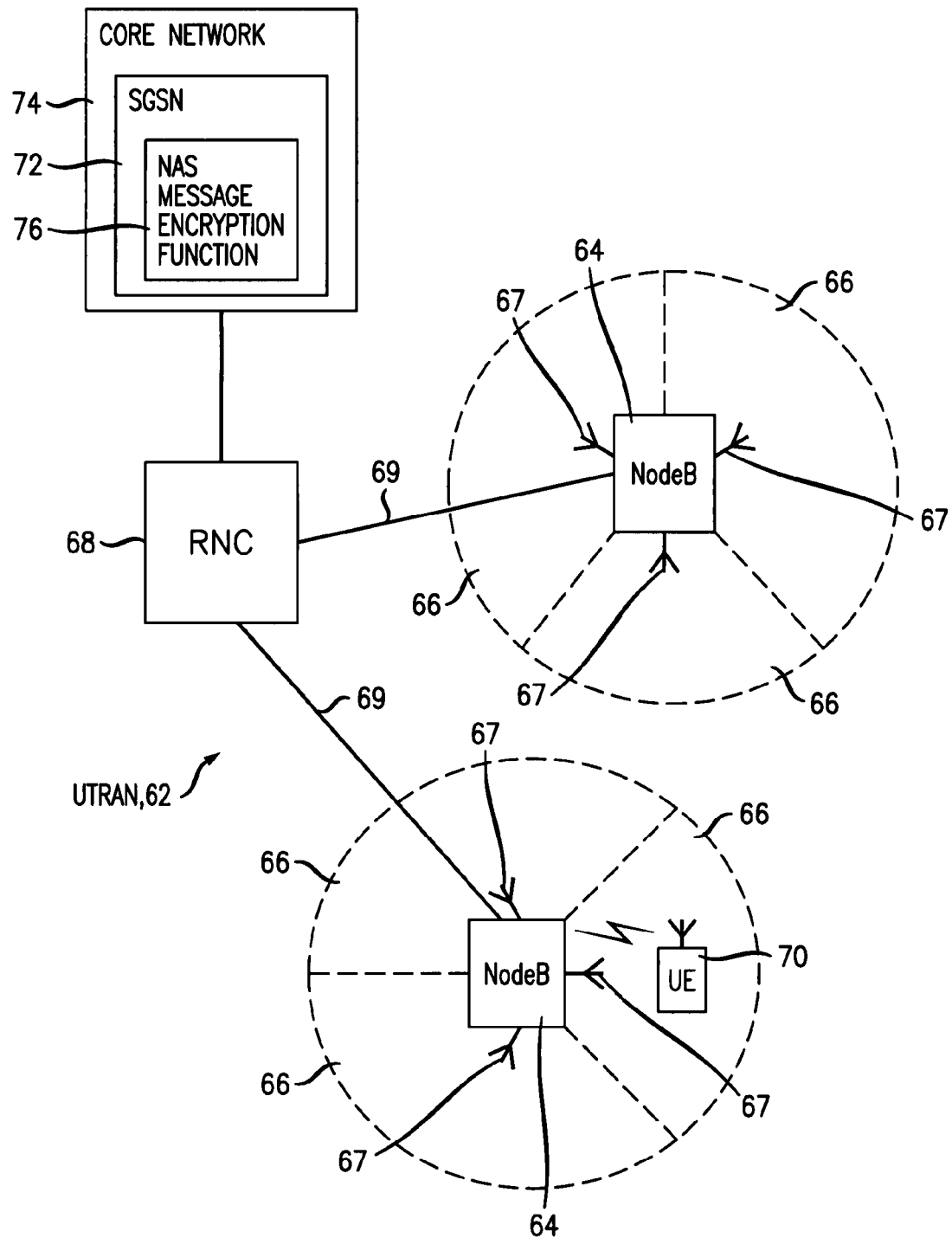
FIG. 8 is a diagram illustrating a Universal Mobile Telecommunications System (UMTS) network according to a second embodiment of the present invention.

The network is a Universal Mobile Telecommunications System (UMTS) terrestrial access network (UTRAN), which is a type of wideband code division multiple access (CDMA) network for mobile telecommunications. The UTRAN network is basically as shown in FIG. 8. Only one radio network controller and two base stations of the UTRAN network 62 are shown for simplicity. As shown in this Figure, the UTRAN network 62 includes base stations 64. In the Figure, each of the base stations 64 is also designated "Node B" in accordance with UMTS terminology. A cell, also referred to as a sector, is the radio-coverage area served by a corresponding antenna of a base station. Each base station typically has three cells 66, each covered by one of three directional antennas 67 angled at 120 degrees to each other in azimuth. Each radio network controller (RNC) 68 typically controls several base stations 64 and hence a number of cells 66. A base station 64 is connected to its controlling radio network controller (RNC) 68 via a respective interface 69 known as an IuB interface. In use, a mobile user terminal 70 (often referred to as User Equipment (UE) in UMTS terminology) communicates with a serving radio network controller (RCN) 68 via at least one cell 66 of at least one base station 64. In that way, the mobile user terminal communicates with the UTRAN network 62.

The RNC is connected to a Serving Gateway Support Node, SGSN, 72 of the core network 74. The SGSN 72 includes a NAS message encryption stage 76 as described in more detail below.

Instigating Encryption in Session Establishment: UMTS Example

The inventors realised that it is possible to combine the Security mode command and Non Access Stratum (NAS) message (such as a session establishment response) into a single combined message. The first part of the message is the security mode command and this part is unencrypted. The second part of the message is a NAS message and this part is encrypted.

Figure 9:
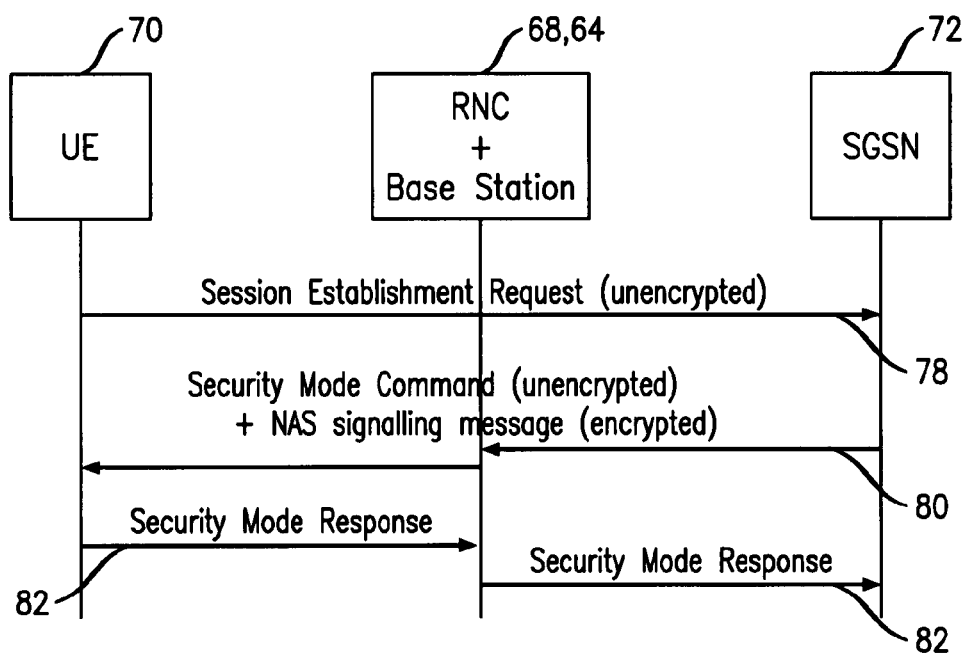
FIG. 9 is a diagram illustrating an approach to instigating encryption as part of session establishment in the network shown in FIG. 8.

As shown in FIG. 9, upon receiving a session establishment request 78, the SGSN 72 sends the combined message 80 consisting of the unencrypted security mode command and encrypted NAS signalling message to the RNC 68 and hence base station 64. This causes the base station 64 to forward the combined message 80 to the mobile terminal (User Equipment, UE 70).

The combined message 80 consists of an unencrypted security command and an encrypted NAS message. The security command consists of information elements defining security context information such as an identifier of the encryption key to be used, and for example, an identifier of start time for the encryption. The encrypted NAS message portion of message 80 consists of information elements constituting a Session Establishment response.

The mobile terminal 70 effects initialisation of its security context and then acknowledges by sending a security mode response 82 to the base station 64 and hence RNC 68 from where the response 82 is forwarded on to the SGSN 72.

General

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Some Abbreviations

CN: Core Network
UMTS: Universal Mobile Telecommunications System
UE: User equipment
NAS: Non Access Stratum (also known as the Core network protocol)
MME: Mobility Management Entity
LTE: Long Term Evolution, a term used in 3GPP for system that is being standardised after UMTS
IE: Information Element
RRC: Radio Resource Control (The Radio part of the control protocol otherwise called Access Stratum part of the control protocol)
SGSN: Signalling Gateway Support Node.

The invention claimed is:

1. A method of transmitting encrypted user data to a mobile terminal in a wireless telecommunications network, the method comprising:
    sending to the mobile terminal a data packet, the data packet comprising both:
        an identifier of encryption information for use by the mobile terminal in initializing a security context that enables the mobile terminal to recover encrypted user data in response to receipt of the data packet, and
        user data encrypted using said encryption information;
    wherein the network comprises an LTE network;
    wherein the data packet comprises a Security Mode Command, the Security Mode Command comprising the identifier of the encryption information.

2. A method according to claim 1, wherein the identifier of the encryption information comprises an identifier of an encryption algorithm.

3. A method according to claim 2, wherein the encryption information comprises an encryption key.

4. A method according to claim 2, wherein the user data comprises user traffic data.

5. A method according to claim 2, further comprising the step of the mobile terminal using the identified encryption information to recover the user data.

6. A method according to claim 5, further comprising the mobile terminal storing the identified encryption information for use in recovering encrypted user data in a subsequently received data packet.

7. A method according to claim 1, wherein the user data comprises user signaling data.

8. A method according to claim 7, wherein the user signaling data comprises an NAS message or an RRC message.

9. A method according to claim 1, further comprising the step of the mobile terminal using the identified encryption information to recover the user data.

10. A method according to claim 9, further comprising the mobile terminal storing the identified encryption information for use in recovering encrypted user data in a subsequently received data packet.

11. A method according to claim 1, wherein the user data comprises user traffic data.

12. A method according to claim 1, wherein the encryption information comprises an encryption key.

13. An LTE wireless telecommunications base station comprising:
    a transmitter adapted to transmit encrypted user data in a data packet, the data packet comprising:
        an identifier of encryption information transmitted for the first time, said encryption information being adapted to be used in a receiver to recover encrypted user data, and
        user data encrypted using said encryption information;
    wherein the data packet comprises a Security Mode Command, the Security Mode Command comprising the identifier of the encryption information.

14. A wireless telecommunications terminal comprising:
    a receiver; and
    a processor;
    wherein the receiver is adapted to receive a data packet, the data packet comprising both an identifier of encryption information to be used in recovering encrypted user data, and user data encrypted using said encryption information;
    wherein in response to receipt of the data packet, the wireless telecommunications terminal initializes a security context using the identified encryption information;
    wherein the processor is adapted to use said encryption information to recover the user data encrypted using said encryption information, the wireless telecommunications mobile terminal being adapted to store said encryption information for subsequent use;
    wherein the terminal is an LTE wireless telecommunications terminal; and
    wherein the data packet comprises a Security Mode Command, the Security Mode Command comprising the identifier of the encryption information.

15. A wireless telecommunications terminal according to claim 14, wherein the processor is shared by the receiver.

16. A method for use by a mobile terminal in a wireless telecommunications network receiving encrypted user data, the method comprising:
    receiving a first data packet at the mobile terminal, the first data packet comprising user data encrypted using first encryption information;
    recovering the user data in the mobile terminal using the first encryption information stored in the mobile terminal;
    receiving a next data packet at the mobile terminal, the next data packet comprising both an identifier of updated encryption information to be used in recovering encrypted user data in said next data packet, and user data encrypted using said updated encryption information;
    wherein the mobile terminal is an LTE wireless telecommunications terminal; and wherein the data packet comprises a Security Mode Command, the Security Mode Command comprising the identifier of the encryption information.

17. A method according to claim 16, further comprising the step of the mobile terminal initializing a security context using the identified updated encryption information in response to receipt of said next data packet at the mobile terminal.

18. A method according to claim 17, further comprising the step of the mobile terminal using said updated encryption information to recover the user data encrypted in said next data packet using said updated encryption information.

19. A method according to claim 18, further comprising the step of the mobile terminal storing said updated encryption information for subsequent use in decrypting subsequent packets.

20. A wireless telecommunications terminal comprising:
means for receiving a data packet, the data packet comprising both an identifier of encryption information to be used in recovering encrypted user data, and user data encrypted using said encryption information;
means for initializing a security context of said wireless telecommunications terminal using the identified encryption information in response to receipt of said data packet;
means for recovering said user data encrypted using said encryption information; and
means for storing said encryption information for subsequent use;
wherein said terminal is an LTE wireless telecommunications terminal; and
wherein the data packet comprises a Security Mode Command, the Security Mode Command comprising the identifier of the encryption information.

21. A wireless telecommunications terminal according to claim 20, wherein said means for receiving said data packet comprises a receiver of the wireless telecommunications terminal.

22. A wireless telecommunications terminal according to claim 20, wherein said means for recovering said user data comprises at least one processor of the wireless telecommunications terminal.

23. A method of transmitting encrypted user data to a mobile terminal in a wireless telecommunications network, the method comprising:
sending to the mobile terminal a data packet, the data packet comprising both:
user data encrypted using encryption information; and
an identifier of said encryption information which is useable by the mobile terminal to initialize a security context for use in recovering said encrypted user data;
wherein the network comprises an LTE network; and
wherein the data packet comprises a Security Mode Command, the Security Mode Command comprising the identifier of the encryption information.

* * * * *

UNITED STATES PATENT AND TRADEMARK OFFICE
CERTIFICATE OF CORRECTION

PATENT NO. : 8,494,163 B2  
APPLICATION NO. : 12/443109  
DATED : July 23, 2013  
INVENTOR(S) : Casati et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 898 days.

Signed and Sealed this
Eighth Day of September, 2015

Michelle K. Lee
*Director of the United States Patent and Trademark Office*